3,641,226
METHOD FOR PURIFICATION OF DI-(2-ETHYL-HEXYL) PHOSPHORIC ACID

Jerry A. Partridge, Richland, Wash., and Reilly C. Jensen, San Diego, Calif., assignors to the United States of America as represented by the United States Atomic Energy Commission
No Drawing. Filed Nov. 24, 1969, Ser. No. 879,628
Int. Cl. C07f 1/08, 9/02
U.S. Cl. 260—990      8 Claims

ABSTRACT OF THE DISCLOSURE

Purification of di-(2-ethylhexyl) phosphoric acid (D2EHPA) in an organic solvent is accomplished by adding freshly precipitated copper hydroxide to the solution to form the copper salt of D2EHPA. The addition of acetone precipitates the copper salt which is separated from the solvent containing the impurities and washed. Treatment of the salt with a dilute mineral acid removes the metal ion, leaving the purified D2EHPA.

CONTRACTUAL ORIGIN OF THE INVENTION

The invention described herein was made in the course of, or under, a contract with the U.S. Atomic Energy Commission.

BACKGROUND OF THE INVENTION

This invention relates to a method for the purification of di-(2-ethylhexyl) phosphoric acid. Di-(2-ethylhexyl) phosphoric acid (hereafter referred to as D2EHPA) is important commercially as an extractant in the solvent extraction of metal ions. For example, it is used with tri-butyl phosphate for the removal and recovery of strontium isotopes from nuclear reactor fuel reprocessing waste solutions. It is also used for the separation of rare earths.

Commercially available D2EHPA ordinarily is not pure and may contain small amounts of mono-(2-ethylhexyl) phosphoric acid, tri-(2-ethylhexyl) phosphoric acid, 2-ethylhexyl and other organic impurities as well as metal contaminants such as Fe(III). In addition, D2EHPA may pick up additional impurities while being used as a solvent extractant. Since impurities such as these can affect the extraction characteristics, it is desirable to have purified D2EHPA.

Although many metal ions which may be present in the D2EHPA as impurities can be removed by washing in nitric acid, Fe(III), which is often present in nuclear reactor fuel reprocessing waste solutions, is not one of the ions which can be so removed.

Organic impurities in the D2EHPA can be removed by partition between immiscible solvents; however, by this method it is difficult to remove small amounts of some impurities, the procedures are quite time-consuming, and may result in a significant loss of product.

SUMMARY OF THE INVENTION

We have developed a method of purifying D2EHPA which easily and readily removes the organic impurities which are normally present in D2EHPA. In addition, our method will remove any ferric ion present.

By our method, the D2EHPA is dissolved in an appropriate organic solvent and an excess of a metal hydroxide is added to the solution to form the metal salt of D2EHPA. This metal salt is then separated from the solvent and washed free of impurities. Contacting the purified metal salt with a dilute mineral acid will convert the D2EHPA back to the acid form which can then be readily separated from the aqueous acid solution.

It is therefore one object of this invention to provide a quick and effective method of purifying D2EHPA.

It is another object of this invention to provide a method of removing organic impurities often found in D2EHPA.

It is a further object to provide a method of removing small amounts of iron contaminants from D2EHPA.

DETAILED DESCRIPTION OF THE PREFERRED EMBODIMENT

These and other objects can be attained by dissolving D2EHPA in an appropriate organic solvent such as diethyl ether. After disolution of the D2EHPA, the copper salt of D2EHPA is prepared by adding an excess of freshly precipitated copper hydroxide to the solution or by preparation of the copper hydroxide directly in the solution. This may be done by the addition of an aqueous solution of copper sulfate to which is added sodium hydroxide which precipitates the copper hydroxide. The copper hydroxide thus formed then reacts with the D2EHPA, forming the copper salt of D2EHPA.

After removal of any aqueous phase present, the salt formed is separated from the organic solution. This separation may take place in several ways. The salt may be precipitated by the slow addition of sufficient acetone to precipitate all of the salt present while stirring to ensure complete mixing. A crystalline product may be formed by adding just enough acetone to lower the solubility of the salt but not enough to result in precipitation, and then slowly evaporating the solvent until all of the salt has crystallized. The copper salt is then separated from the solvent, filtered, washed and dried. If necessary, it may be redissolved in solvent and reprecipitated in order to achieve the desired degree of purity.

Conversion of the copper salt to the acid form of D2EHPA is accomplished by contacting the salt with a dilute acid solution which strips the copper. The purified D2EHPA is then separated from the dilute acid solution and washed with distilled water to remove any dissolved acid. The small amount of water remaining in the D2EHPA may be removed by placing the D2EHPA in a rotating evaporator at 50° C. and in 15 mm. of mercury pressure.

While ether is the preferred solvent, a number of other organic solvents are quite satisfactory for the method of this invention. These include benzene, carbon tetrachloride, cyclohexane and methyl alcohol.

The amount of D EHPA dissolved in the organic solvent may range from 0.1 M to about 2.0 M. Above 2 M the solution is too viscous to work effectively, and below concentrations of about 0.1 M the copper salt will not precipitate completely from the solution.

A number of metal salts of D2EHPA may be formed and used for the practice of this invention. These include, in addition to copper, which is preferred, nickel, cobalt, neodymium, uranium and cerium. The nickel and cobalt salts do not precipitate with acetone as completely as does the copper salt, and the neodymium, uranium and cerium salts are amorphous and are difficult to filter.

The metal salts are prepared by the addition to the organic solution of an aqueous solution of the metal sulfate or nitrate followed by the addition of sodium hydroxide to form freshly precipitated metal hydroxide in the organic solution which then reacts with the D2EHPA, forming the metal salt. An alternative method of preparation is to add freshly precipitated metal hydroxide to the organic solution containing the D2EHPA. It is essential that the freshly prepared metal hydroxide be used in order to obtain complete salt formation.

After the D2EHPA salt is completely precipitated, it is separated from the remaining solvent by any conventional method such as filtering. The salt is then washed with additional acetone to remove any impurities which may adhere thereto.

Aqueous solutions containing from about 1 N to 3 N of hydrochloric, nitric or sulfuric acids are quite satisfactory to strip the metal ion from the D2EHPA salt to achieve the purified acidic form D2EHPA.

The following example is given as illustrative of the process of this invention and is not to be taken as limiting the scope or extent of the invention.

EXAMPLE

A solution of 100 ml. impure D2EHPA in 150 ml. of diethyl ether was found to contain 92.8 w/o D2EHPA, 1.9 w/o mono-(2-ethylhexyl) phosphoric acid and 5.3 w/o non-acidic impurity. The solution was intensely colored due to the presence of 0.06 w/o Fe(III).

The above solution was contacted with 50 ml. 2 M $CuSO_4$ and 20 ml. of 10 M NaOH was added in small increments while the two phases were being mixed with a Teflon-covered magnetic stirring bar. When all the $Cu(OH)_2$ precipitate had dissolved and the Cu(II) had extracted, the phases were allowed to separate and the aqueous phase was removed from the container.

Then 30 ml. of 2 M $CuSO_4$ were added and 10 M NaOH were added in small incremental amounts until excess $Cu(OH)_2$ precipitate remained after 3 hours of mixing of the two phases.

The organic phase was then separated from the aqueous phase. To precipitate the $Cu(DEHP)_2$, reagent grade acetone was slowly added while the solution was being stirred. Acetone was added until no further precipitation occurred.

The precipitate was then filtered, washed with acetone, and dried. The $Cu(DEHP)_2$ salt was redissolved in 75 ml. of ether twice and each time it was precipitated, filtered, washed and dried as above.

The dried $Cu(DEHP)_2$ powder was then contacted with 100 ml. 3 M $HNO_3$. The two phases were mixed with a Teflon-covered magnetic stirrer for 3 hours to strip the Cu(II) from the organic phase. To ensure complete removal of the Cu(II) from the HDEHP the latter was washed with two additional 50 ml. solutions of 3 M $HNO_3$ for ½ hour each.

The HDEHP product was then washed with 50 ml. portions of distilled water until the water gave no acid color when tested with Hydrion paper.

Dissolved water was then removed from the HDEHP product in a rotating evaporator at 55° C. and 15 mm. Hg pressure. Eighty milliliters of clear, colorless product were obtained.

Titration of the product in an ethyl alcohol-water solvent with standard NaOH showed it to have an equivalent weight of 322.7±0.5, based on three titrations, which is very close to the theoretical equivalent weight of D2EHPA, which is 322.4.

It can be seen from the above example that the process of this invention produces a very high-purity D2EHPA product.

It is understood that the invention is not to be limited to the details given herein but that it may be modified within the scope of the appended claims.

The embodiments of the invention in which an exclusive property or privilege is claimed are defined as follows:

1. A method of purifying di-(2-ethylhexyl) phosphoric acid (D2EHPA) comprising: dissolving said D2EHPA in an organic solvent selected from the group consisting of benzene, carbon tetrachloride, cyclohexane, diethyl ether, and methyl alcohol to form a solution; adding sufficient metal hydroxide selected from the group consisting of copper, nickel, cobalt, uranium, neodymium and cerium to said solution to form the metal salt of D2EHPA; adding acetone to said solution, thereby decreasing the solubility of the metal salt; separating the metal salt from the organic solvent; adding an aqueous solution of a mineral acid selected from the group consisting of HCl, $HNO_3$ and $H_2SO_4$ to the metal salt, thereby stripping the metal ion from the D2EHPA, and separating the purified D2EHPA from the aqueous solution.

2. The method of claim 1 wherein the organic solvent contains 0.1 to 2.0 M D2EHPA.

3. The method of claim 1 wherein the metal hydroxide is freshly precipitated.

4. The method of claim 3 wherein the metal hydroxide is copper and is formed by adding an aqueous solution containing 0.1 to 3.0 M copper sulfate to said organic solvent, and adding sufficient sodium hydroxide to react with the copper sulfate to form copper hydroxide which then reacts with D2EHPA to form the copper salt of D2EHPA.

5. The method of claim 1 wherein the metal salt of D2EHPA is separated from the organic by the addition of sufficient acetone to the organic solution to precipitate the metal salt.

6. The method of claim 1 wherein the metal salt of D2EHPA is separated by adding a small amount of acetone to the organic solvent to form a saturated solution of metal salt and evaporating the solvent to crystallize the metal salt.

7. The process of claim 4 wherein the copper is removed from the D2EHPA with an aqueous solution of 1.0 to 5.0 N nitric acid or hydrochloric acid.

8. A method of purifying D2EHPA comprising: dissolving 1 M D2EHPA in diethyl ether; adding sufficient freshly precipitated copper hydroxide to the ether solution to form the copper salt of D2EHPA which is soluble in the ether; adding sufficient acetone to the solution to completely precipitate the copper salt of D2EHPA; separating the salt from the ether and contacting the salt with a 2 M nitric acid solution, thereby stripping the copper from the purified D2EHPA.

No references cited.

JOSEPH REBOLD, Primary Examiner

A. H. SUTTO, Assistant Examiner

U.S. Cl. X.R.

260—429.1, 429.2 438.1, 439 R